United States Patent [19]

Pizzi

[11] 4,168,124

[45] Sep. 18, 1979

[54] METHOD AND DEVICE FOR MEASURING THE SOLAR ENERGY RECEIVED AT A PARTICULAR PLACE

[75] Inventor: Gilbert Pizzi, Toulouse, France

[73] Assignee: Centre National d'Etudes Spaciales, Paris, France

[21] Appl. No.: 815,307

[22] Filed: Jul. 13, 1977

[30] Foreign Application Priority Data

Jul. 13, 1976 [FR] France .............................. 76 21417

[51] Int. Cl.$^2$ .............................................. G01J 1/42
[52] U.S. Cl. .................................... 356/215; 356/218
[58] Field of Search ................ 356/213, 215, 218, 226

[56] References Cited

U.S. PATENT DOCUMENTS

| 3,617,137 | 11/1971 | Meyers | 356/215 |
| 3,843,265 | 10/1974 | Egli | 356/226 X |
| 3,846,028 | 11/1974 | List | 356/226 |
| 3,972,626 | 8/1976 | Laskowski | 356/226 |
| 3,999,061 | 12/1976 | McLaughlin | 356/215 |

OTHER PUBLICATIONS

R. M. Masters "Solar Energy Meter" NASA, Lewis Research Center, Cleveland, Ohio, #TM-73791, Sep. 1977.

Primary Examiner—Rolf G. Hille

[57] ABSTRACT

The invention provides a method and apparatus for measuring and recording the amount of solar energy falling at a place over a given period of time, comprising means for producing a frequency signal representative of the energy falling at the place, the provision of the frequency signal being controlled in response to the level of solar energy falling exceeding a morning threshold and falling below an evening threshold, and the frequency signal being applied to a counter, preferably fitted with print-out means, whereby the counter may record the total energy falling between the morning and evening thresholds.

8 Claims, 4 Drawing Figures

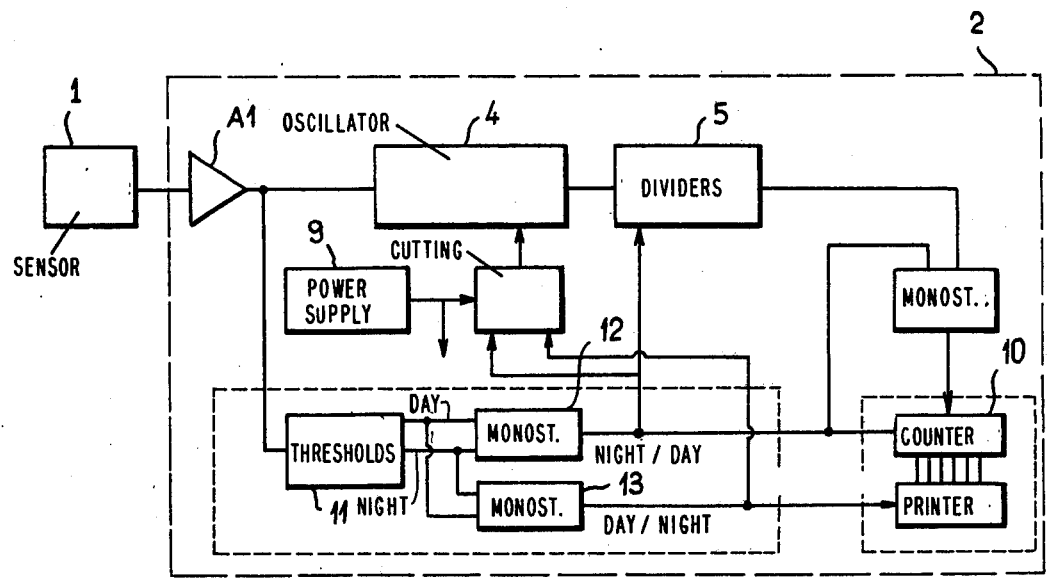
FIG._2
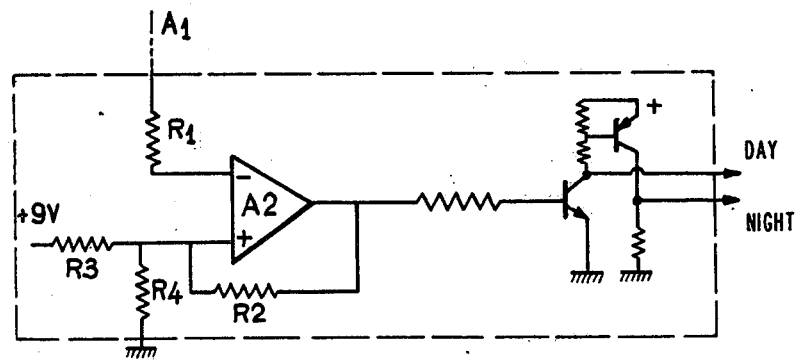
FIG._3

METHOD AND DEVICE FOR MEASURING THE SOLAR ENERGY RECEIVED AT A PARTICULAR PLACE

BACKGROUND OF THE INVENTION

The invention relates to the measurement of solar energy received at a particular place.

In most applications of solar energy, there is a need for statistical data regarding the distribution of energy in time and space.

The knowledge available at present is either inaccurate or unsuitable for using solar energy.

There is therefore a need for an easily transportable, inexpensive measuring instrument which can measure the energy received during a given period, using the same pick-ups as are used for the applications.

SUMMARY OF THE INVENTION

In one aspect the invention provides a method of measuring the solar energy received at a particular place, using a voltage-frequency converter for converting the energy received at the place into a representative frequency signal adapted to be counted, the signal being sent to a counting input of a counter, wherein the voltage-frequency converter is switched on by connecting it to an electric supply circuit as soon as the input signal reaches a first preset minimum value corresponding to a morning threshold and the voltage-frequency converter is switched off by disconnecting it from the supply circuit when the input signal falls below a second preset value corresponding to an evening threshold which is below the first preset minimum value so that the counter sums the energy received from the moment when the input signal has reached the first minimum value to the moment when the signal has decreased to the second value.

In a further aspect the invention provides a device for measuring the solar energy received at a particular place, comprising a pick-up which is arranged to receive solar energy and supply a corresponding electric signal, a converting circuit connected to receive said corresponding signal and convert it into a representative frequency signal, a threshold circuit connected to receive said corresponding signal and arranged to provide a dawn signal corresponding to the morning threshold of energy falling on said pick-up and a dusk signal corresponding to the evening threshold of energy falling on said pick-up, and a counter circuit connected to said converting circuit and to said threshold circuit to count under the control of the threshold circuit the cycles of said representative frequency signal, between the occurance of said dawn and dusk signals.

In an embodiment of the invention, converting circuit comprises a voltage controlled-frequency oscillator. Advantageously the ratio of the frequency to the voltage is divided so that the frequency supplied to the counter is 1 Hz when the solar energy received at ground level is 1 W/m$^2$.

Advantageously, according to another feature of the invention, the device comprises a printer connected (a) to the counter and (b) to the threshold circuit, to record the contents of the counter, the printer being actuated by the dusk signal.

BRIEF DESCRIPTION OF DRAWINGS

We shall now, by way of example, describe a preferred embodiment of an aforementioned device, with reference to the accompanying drawings in which:

FIG. 2 is a more detailed diagram of the device;

FIG. 3 shows a detail of the threshold circuit of the device, and

DESCRIPTION OF PREFERRED EMBODIMENT

Figure 1:
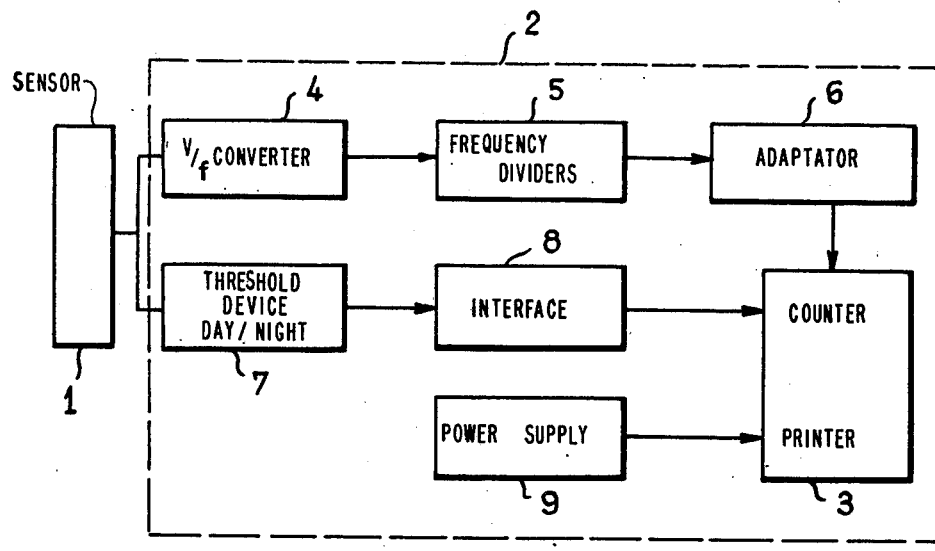
FIG. 1 is a general block diagram of the device.

The device shown in FIG. 1 comprises:
a solar energy pick-up 1;
an electronic assembly 2 comprising inter alia a printer and counter 3 and an independent power supply 9.

The pick-up 1 is for example a photovoltaic solar cell of known type per se mounted on a steerable holder.

The photocell is secured to a one-piece holder. It is protected by a plate of glass (not shown) secured by adhesion. The assembly is connected to the electronic assembly 2 by a screened two-wire cable. The cell is electrically energised through a resistor having a value such that the following relation is obtained between the current through the cell and the solar flux falling on the cell: 1 mA→1 W/cm$^2$.

The electronic assembly 2 comprises:

A voltage/frequency converter 4, frequency dividers 5 and means 6 for actuating the printer and counter 3;

A threshold device 7 giving a day/night signal for switching the recording device on and off, and an interface 8 between device 7 and the printer and counter 3. The printer is a 6-digit electromechanical printer which prints on paper tape. The readout given by the printer is directly in Wh/m$^2$/day (Watt hours/square meter/day); and An electrical supply system 9 comprising a panel containing a set of solar cells arranged to charge a storage battery, followed by a converter delivering supply voltages suitable for operating the electronic assembly (alternatively the panel of solar cells is replaced by a device for matching to the mains).

A more detailed explanation of the operation and structure of the instrument will now be given with reference to FIGS. 2–4.

The aim is to integrate the energy received during a day and record a value for the total.

Pick-up 1 supplies a voltage (useful range 1 mV to 200 mV approx.) proportional to the solar flux received at any instant; this voltage is amplified by an amplifier A1 (FIG. 2).

The amplified voltage is used as a parameter for controlling a variable-frequency oscillator 7, which thus delivers a frequency proportional to the input voltage (e.g. 10 Hz/mV). The amplifier gain and the frequency/voltage ratio are chosen so that the frequency is e.g. 1 Hz when the solar energy received at the ground is 1 W/m$^2$. The frequency is divided by 3,600 in frequency dividers 5 and the resulting cycles and counted by a counter 10 in the printer and counter unit 3 over a period of time. As a result of the division by 3,600 the summed energy can be counted in Wh/m$^2$ units.

A threshold circuit 11 with hysteresis is provided for detecting the dawn (approx. 15 to 20 W/m²) and dusk approx. 5 W/m².

Circuit 11 shown in more detail in FIG. 3 comprises a differential amplifier A2 having an inverting (—) input and a non-inverting (+) input and wired so as to act as a comparator. Circuit 11 receives the output voltage of amplifier A1, via a resistor R1.

The output of amplifier A2 is either at the level —9 v (e.g. by day) or at the level —9 v (at night).

At night, therefore, the voltage at its positive input is $[R4(R2+R3)/R2R3] \times 9$ v; if the output of amplifier A1 rises above this value (the first threshold), the output of A2 abruptly changes to —9 v, defining a new voltage at the positive input, i.e.

$$[R2R4 - R3R4/R2R4 + R3R4 + R2R3] \times 9 \text{ v}$$

(the second threshold value).

By day, the voltage at the positive input remains at the same value until, at nightfall, the voltage at the input falls below this value and again flips over the output of amplifier A2.

The threshold is given hysteresis to ensure a clean transition from a "night" state to a "day" state without vacillation on approaching the change-over level.

The output of amplifier A2 is followed by two transistors connected so as to deliver a day signal or a night signal at two separate outputs. During the day the day output is at 9 v and the night output is at 0, and vice versa during the night. Consequently, the threshold circuit delivers either a day signal or a night signal.

A monostable 12 (FIG. 2) detects the transition from night to day and from it provides an output pulse:

(1) to reset counter 10 to zero and thus start the measuring operation;
(2) to reset to zero the device for counting and dividing by 3,600, and
(3) to energize the controlled oscillator 4 in order to trigger the counting operation by connecting it to the supply 9.

After the zero setting operations have been carried out, counting begins and each incoming pulse is added to the total in the counter.

At night, the threshold circuit detects the corresponding threshold (5 W/m²) which, because of the hysteresis, is lower than the dawn threshold.

A monostable 13 detects the day/night transition and provides an output pulse to actuate the printer, which thereupon prints out the contents summed in the counter.

Monostable 13 is also connected to disconnect the oscillator, to prevent the counter from changing state during the recording operation (since this may result in faulty printing).

Consequently, the counter sums the number of Wh/m² received during the day or, more precisely, the number of Wh/m² received from the moment $H_D$ when the received energy reaches the minimum morning threshold to the moment $H_A$ when the energy has decreased to the minimum evening threshold.

Figure 4:
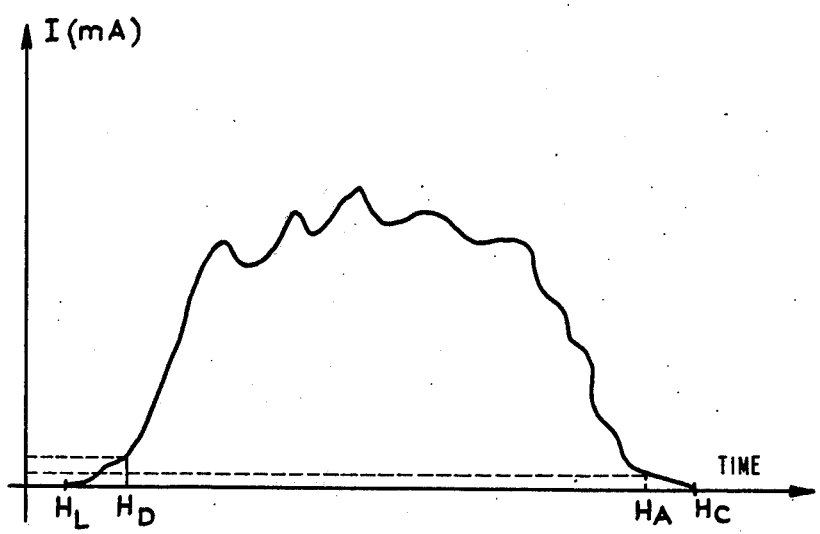
FIG. 4 is a graph illustrating the operating conditions of the device.

By way of example, the curve in FIG. 4 shows the variation with time in the current 1 supplied by the pick-up during a day.

If we take the nominal value of the solar illumination received at ground level in fine weather at 25° C., the day threshold discussed above is chosen to correspond to 2% of this value and the night threshold $H_A$ to correspond to 0.5% of this value. Of course, the values can be modified as required.

Apart form its simplicity, a measuring instrument according to the invention has the advantage of operating at very low power cost, since its operation is limited to the useful recording periods.

What we claim as our invention and desire to secure by Letters Patent is:

1. A device for measuring the solar energy received at a particular place, comprising a pick-up which is arranged to receive solar energy and supply a corresponding electric signal, a threshold circuit connected to receive said corresponding signal and arranged to provide a dawn signal corresponding to the morning threshold of energy falling on said pick-up and a dusk signal corresponding to the evening threshold of energy falling on said pick-up, a night-day detector connected to receive said dawn signal and said dusk signal in order to detect the transition from night to day and produce a corresponding night-day transition signal, a day-night detector connected to receive said dawn signal and said dusk signal in order to detect the transition from day to night and produce a corresponding day-night transition signal, a voltage controlled-frequency oscillator energizable from a supply, said supply being connected to said detectors in order that said night-day transition signal starts the energization of the oscillator by said supply and that said day-night transition signal discontinues said energization, said oscillator being connected to said pick-up in order to convert said corresponding electric signal into a representative frequency signal, and a counter circuit connected to said night-day detector to be reset to zero by said night-day transition signal and connected to said oscillator in order to count the cycles of said representative frequency signals.

2. A device according to claim 1, wherein the ratio of the frequency produced by said oscillators of the voltage applied to it is adjusted so that the frequency is 1 Hz when the solar energy received at ground level is 1 W/m².

3. A device according to claim 1, including a frequency divider interposed between said oscillator and said counter circuit for dividing the frequency by 3,600 so that each counting unit represents 1 Wh/m².

4. A device according to claim 1, wherein said threshold circuit is arranged so that the morning and the evening threshold are independently adjustable.

5. A device according to claim 1, wherein said threshold circuit provides said dawn signal when the solar energy falling an said pick-up passes through a value chosen from the range 15–20 W/m².

6. A device according to claim 1, wherein said threshold circuit provides said dusk signal when the solar energy falling on said pick-up passes through a value of approx. 5 W/m².

7. A device according to claim 1 including a printer connected to said counter in order to record the contents thereof and connected to said day-night detector to be actuated by said day-night transition output signal.

8. A device according to claim 1, wherein said detector are monostables.

* * * * *